(12) United States Patent
Seto et al.

(10) Patent No.: US 7,611,773 B2
(45) Date of Patent: Nov. 3, 2009

(54) GLASS COMPOSITION AND LAMINATED GLASS

(75) Inventors: Hiromitsu Seto, Osaka (JP); Nobuyuki Yamamoto, Osaka (JP); Hiroyuki Tanaka, Osaka (JP)

(73) Assignee: Nippon Sheet Glass Co., Ltd., Tokyo (JP)

( * ) Notice: Subject to any disclaimer, the term of this patent is extended or adjusted under 35 U.S.C. 154(b) by 67 days.

(21) Appl. No.: 11/762,527

(22) Filed: Jun. 13, 2007

(65) Prior Publication Data

US 2007/0238600 A1 Oct. 11, 2007

Related U.S. Application Data

(62) Division of application No. 10/668,175, filed on Sep. 24, 2003, now abandoned.

(30) Foreign Application Priority Data

Sep. 25, 2002 (JP) ............ P.2002-278505

(51) Int. Cl.
*B32B 17/06* (2006.01)
*B32B 17/10* (2006.01)
*C03C 3/087* (2006.01)

(52) U.S. Cl. ............ 428/426; 428/441; 501/70; 501/71

(58) Field of Classification Search ............ 501/70, 501/71; 428/426, 441
See application file for complete search history.

(56) References Cited

U.S. PATENT DOCUMENTS

| | | | |
|---|---|---|---|
| 4,654,255 A * | 3/1987 | Kojima et al. ............ 442/149 |
| 5,200,369 A | 4/1993 | Clifford et al. |
| 5,264,400 A | 11/1993 | Nakaguchi et al. |
| 5,362,689 A | 11/1994 | Morimoto et al. |
| 5,792,559 A * | 8/1998 | Heithoff et al. ............ 428/437 |
| 6,042,947 A * | 3/2000 | Asakura et al. ............ 428/437 |
| 6,150,028 A * | 11/2000 | Mazon ............ 428/426 |
| 6,191,059 B1 * | 2/2001 | Varanasi ............ 501/70 |
| 6,277,492 B1 * | 8/2001 | Boaz ............ 428/426 |
| 6,607,832 B1 * | 8/2003 | Nagashima et al. ............ 428/428 |
| 6,624,102 B2 | 9/2003 | Seto et al. |
| 6,858,553 B2 * | 2/2005 | Seto et al. ............ 501/70 |
| 2002/0068678 A1 | 6/2002 | Seto et al. |

FOREIGN PATENT DOCUMENTS

| | | |
|---|---|---|
| EP | 0488110 A1 | 11/1991 |
| EP | 0 687 554 A1 | 12/1995 |
| EP | 0 812 678 A2 | 12/1997 |
| EP | 0 864 545 A1 | 9/1998 |
| EP | 0 979 804 A1 | 2/2000 |
| JP | 3-187946 A | 8/1991 |
| JP | 4-310539 A | 11/1992 |
| JP | 5-97469 A | 4/1993 |
| JP | 6-316434 A | 11/1994 |
| JP | 8-500811 T | 1/1996 |
| JP | 9-208251 A | 8/1997 |
| JP | 10-297934 A | 11/1998 |
| JP | 2001-151539 A | 6/2001 |
| JP | 2002-160938 A | 6/2002 |
| WO | 91/07356 A1 | 5/1991 |

OTHER PUBLICATIONS

XP-002259508—Abstract of AN 2001-21 86 18 Apr. 2, 2003.
European Search Report dated Nov. 10, 2003.
Japanese Office Action dated Jun. 30, 2009.

* cited by examiner

*Primary Examiner*—Karl E Group
*Assistant Examiner*—Elizabeth A Bolden
(74) *Attorney, Agent, or Firm*—Sughrue Mion, PLLC

(57) ABSTRACT

A laminated glass having a low haze ratio and an excellent infrared rays shield performance and a glass composition suitable for use in a laminated glass and easy with respect to melting and molding works, which is a glass composition comprising 65 to 74% of $SiO_2$, 0 to 5% of $B_2O_3$, 1.9 to 2.5% of $Al_2O_3$, 1.0 to 3.0% of MgO, 5 to 10% of CaO, 0 to 10% of SrO, 0 to 10% of BaO, 0 to 5% of $Li_2O$, 13 to 17% of $Na_2O$, 0.5 to 5% of $K_2O$, 0 to 0.40% of $TiO_2$ and 0.3 to 2.0% of total iron oxide in terms of $Fe_2O_3$, on a weight basis, in which the sum of MgO, CaO, SrO and BaO is from 10 to 15% and the sum of $Li_2O$, $Na_2O$ and $K_2O$ is from 14 to 20%, wherein the glass composition has a visible light transmittance of 80% or more as measured with the CIE Standard illuminant A and a total solar energy transmittance of not more than 62% at a thickness of 2.1 mm, and a laminated glass using a glass sheet made of that glass composition.

3 Claims, No Drawings

GLASS COMPOSITION AND LAMINATED GLASS

This is a divisional of application Ser. No. 10/668,175 filed Sep. 24, 2003, now abandoned. The entire disclosure of the prior application, application Ser. No. 10/668,175, is hereby incorporated by reference.

FIELD OF THE INVENTION

The present invention relates to a laminated glass having an excellent infrared rays (IR rays) shield performance and to a glass composition that is suitable for use in the laminated glass. More specifically, the invention relates to a laminated glass that does not use a specific interlayer or heat ray reflecting film but exhibits an infrared rays shield performance substantially equal to those having an interlayer or heat ray reflecting film and to a glass composition that is suitable for use in the laminated glass.

DESCRIPTION OF THE RELATED ART

In recent years, for reducing loads of air conditioning of automobiles, glazings having an infrared rays shield performance are used as automobile window shields. For example, there are thin film-provided glass sheets in which a thin film made of a metal or a metal oxide is laminated on the surface of a glass sheet. However, since such metal or metal oxide-made thin films have a conductive capacity and shield radio waves, there were caused inconveniences such that actions of a function system by transmitting and receiving of radio waves with the outside of automobiles are hindered and that communications by portable phones are hindered. Thus, laminated glasses not only ensuring a radio wave transmitting capacity but also having an infrared rays shield performance were proposed.

For example, JP-A-2001-151539 describes a laminated glass comprising plural glass sheets having therebetween an interlayer in which IR-shielding fine particles having a particle size of not larger than 0.2 μm are dispersed and compounded, at least one glass sheet of the plural glass sheets being made of a soda lime silica glass containing from 0.3 to 1% of total irons as reduced into $Fe_2O_3$ in terms of a weight percentage.

On the other hand, different from this, there may be a thought that "high infrared rays shield" is attained by enhancing the infrared rays shield performance of a glass sheet itself. Concretely, for reducing the total solar energy transmittance, it may be required to increase an absolute amount of ferrous oxide (FeO) among iron oxides introduced in the glass and enhance a basicity of the glass, thereby shifting a peak of FeO to the long wavelength side. As such glass sheets, is enumerated a glass composition for transparent sheet glass manufacture as described in JP-T-8-500811 (the term "JP-T" as used herein means an "unexamined published international patent application in Japanese" (Tokuhyohei)). This glass composition contains from 69 to 75% of $SiO_2$, from 0 to 3% of $Al_2O_3$, from 2 to 10% of CaO, from 0 to 2% of MgO, from 9 to 17% of $Na_2O$, from 0 to 8% of $K_2O$, and from 0.2 to 1.5% of $Fe_2O_3$ on a weight basis and can further contain fluorine and oxides of zinc, zirconium, cerium and titanium, less than 4% by weight of barium oxide, and not higher than 10% in total of remaining alkaline earth metal oxides.

The laminated glass described in the foregoing JP-A-2001-151539 involved an inconvenience such that for attaining the total solar energy transmittance of not more than 42%, an aspect of which is considered to be a standard for the "high infrared rays shield", the haze ratio is inevitably high as 0.5% or more.

Also, in the glass composition for manufacture of transparent sheet glass as described in the foregoing JP-T-8-500811, for obtaining transmission, the content of the total of alkaline earth metal oxides is controlled at not more than 10%. However, there was involved an inconvenience such that for making the transmission consistent with durability, both the melting point (log η=2) and working point (log η=4) temperatures are high. Further, since MgO is not substantially contained, if the amount of FeO is increased for enhancing the infrared rays shield performance, there was involved an inconvenience such that amber coloration is liable to take place.

SUMMARY OF THE INVENTION

In view of the problems of the related art technologies, the invention was made. An object of the invention is to provide a laminated glass having a low haze ratio and an excellent infrared rays shield performance and a glass composition that is suitable for use in laminated glasses and is easy with respect to melting and forming.

The glass composition of the invention is a glass composition comprising: in % by weight, 65 to 74% of $SiO_2$;
0 to 5% % of $B_2O_3$;
1.9 to 2.5% of $Al_2O_3$;
1.0 to 3.0% of MgO;
5 to 10% of CaO;
0 to 10% of SrO;
0 to 10% of BaO;
0 to 5% of $Li_2O$;
13 to 17% of $Na_2O$;
0.5 to 5% of $K_2O$;
0 to 0.40% of $TiO_2$; and
0.3 to 2.0% of total iron oxide in terms of $Fe_2O_3$ (T-$Fe_2O_3$), in which the sum of MgO, CaO, SrO and BaO is 10 to 15%, and the sum of $Li_2O$, $Na_2O$ and $K_2O$ is 14 to 20%,
wherein, at a thickness of 2.1 mm, the glass composition has a visible light transmittance of 80% or more as measured with the CIE Standard illuminant A and a total solar energy transmittance of not more than 62%.

DETAILED DESCRIPTION OF THE INVENTION

First of all, reasons why the glass composition of the invention is limited will be hereunder described. However, the following composition is expressed in terms of % by weight.

$SiO_2$ is a main component of forming the skeleton of a glass. When the content of $SiO_2$ is less than 65%, durability of the glass is lowered, whereas when it exceeds 74%, melting of the glass becomes difficult. More preferably, the content of $SiO_2$ is in the range of from 65 to 71%.

$B_2O_3$ is not an essential component but a component to be used for enhancing durability of the glass or as a melting aid and also functions to strength absorption of UV rays. When the content of $B_2O_3$ exceeds 5%, a reduction in the transmittance in ultraviolet regions extends to visible regions, the tint tends to become yellowish, and inconveniences during the forming are caused due to volatilization of $B_2O_3$, etc. Thus, the upper limit of the content of $B_2O_3$ is defined to be 5%. Preferably, the content of $B_2O_3$ is in the range of from 0% to 2%.

$Al_2O_3$ is a component of enhancing durability of the glass. For imparting chemical durability at sufficient levels as automobile window shields and others, the content of $Al_2O_3$ is necessary to be 1.9% or more. When the content of $Al_2O_3$ is less than 1.9%, the durability of glass is poor. On the other hand, when it exceeds 2.5%, melting of the glass is difficult. More preferably, the content of $Al_2O_3$ is from 2.0 to 2.4%.

MgO and CaO are used for not only enhancing durability of the glass but also controlling liquidus temperature and viscosity during the forming. SrO and BaO are each not an essential component but are used for not only enhancing durability of the glass but also controlling liquidus temperature and viscosity during the forming. In the invention, by setting up the content of MgO at from 1.0 to 3.0% and the content of the sum of alkaline earth metal oxides (MgO+CaO+SrO+BaO) at 10% or more, it is possible to enhance a basicity of the glass, thereby shifting a peak of FeO to the long wavelength side and enhancing the infrared rays shield performance. Thus, it is possible to make the solubility consistent with the durability.

When the content of MgO exceeds 3.0%, a sufficient infrared rays shield performance is not obtained. On the other hand, when it is less than 1.0%, the glass tends to cause amber coloration so that sufficient FeO amount and visible light transmittance are not stably obtained. When the content of CaO is less than 5% or exceeds 10%, the liquidus temperature increases. Also, SrO and BaO are each not an essential component, but when they are introduced into a glass in place of MaO and CaO, a high basicity can be obtained. Since raw materials of SrO and BaO are expensive, their contents are each from 0 to 10%. Also, when the content of the sum of the alkaline earth metal oxides is less than 10%, not only a sufficient infrared rays shield performance is not obtained, but also the liquidus temperature during the forming increases, and it is difficult to make solubility consistent with durability. On the other hand, when it exceeds 15%, since the liquidus temperature increases, and the density of the glass becomes high, such is not preferable from the standpoint of glass manufacture. More preferably, the content of the sum of the alkaline earth metal oxides exceeds 10% and is less than 12%.

$Na_2O$ and $K_2O$ are used as a melting accelerator of the glass. $Li_2O$ is not an essential component but is used as a melting accelerator, too. When the content of $Na_2O$ is less than 13%, or the content of the sum of $Li_2O$, $Na_2O$ and $K_2O$ is less than 14%, the melting acceleration effect is poor. On the other hand, when the content of $Na_2O$ exceeds 17%, or the content of the sum of $Li_2O$, $Na_2O$ and $K_2O$ exceeds 20%, the durability of the glass is lowered. Since $Li_2O$ is expensive as compared with $Na_2O$, it is not preferable that the content $Li_2O$ exceeds 5%. Also, when $K_2O$ is introduced into the glass in place of $Li_2O$ or $Na_2O$, it has an effect for increasing the basicity of the glass. Accordingly, it is preferable to add $K_2O$ in an amount of 0.5% or more, and preferably 1% or more. The content of the sum of $Li_2O$, $Na_2O$ and $K_2O$ is preferably from 14.5 to 19%.

When the addition amount of $TiO_2$ is high, the glass tends to become yellowish, and therefore, its upper limit is 0.40%.

Iron oxides are present in the form of $Fe_2O_3$ and FeO in the glass. $Fe_2O_3$ absorbs UV rays, and FeO absorbs IR rays. The glass composition of the invention contains from 0.3 to 2.0% of total iron oxides as reduced into $Fe_2O_3$ (hereinafter referred to as "T-$Fe_2O_3$"). Thus, when a laminated glass is formed, a high IR rays shield performance with a total solar energy transmittance of not higher 42% can be obtained. When the content of T-$Fe_2O_3$ is less than 0.3%, the IR rays shield performance is low, whereas when it exceeds 2.0%, the visible light transmittance is lowered.

In the case where it is contemplated to make the glass composition have both a high infrared rays shield performance and a high visible light transmittance, it is preferable that the glass composition contains from 0.55 to 1.3% of T-$Fe_2O_3$, from 0.01 to 0.20% of $TiO_2$, and from 0 to 2.0% of $CeO_2$, with a ratio of FeO being from 22 to 48% of T-$Fe_2O_3$. Especially, it is more preferable that the glass composition contains from 0.55 to 0.75% of T-$Fe_2O_3$, from 0.01 or more and less than 0.20% of $TiO_2$, and from 0 to 1.0% of $CeO_2$, with a ratio of FeO being from 22 to 48% of T-$Fe_2O_3$.

For adjustment of the glass tint and other reasons, coloring components, CoO, NiO, Se and $Cr_2O_3$ can be introduced into the glass of the invention. It is preferable that the addition amount ranges of CoO, NiO, Se and $Cr_2O_3$ are less than 0.005%, not higher than 0.01%, not higher than 0.001%, and not higher than 0.02%, respectively.

The glass of the invention has excellent solubility. Here, the melting point (a temperature at log $\eta$=2) temperature is used as a substituent characteristic for the solubility. The lower the melting point, the more excellent the solubility is. It is preferable that the glass composition of the invention has a melting point of not higher than 1,400° C. Further, for easily forming a glass, it is preferable that the glass composition of the invention has a working point (a temperature at log $\eta$=4) of not higher than 1,010° C.

The laminated glass of the invention is obtained by laminating at least one resin layer between at least two glass sheets containing at least one glass sheet comprising the glass composition of the invention. As the respective glass sheets, ones having a thickness of from 1.6 to 2.1 mm are in general used. In the glass sheet comprising the glass composition of the invention, ones having such characteristics that the visible light transmittance is 80% or more, and the total solar energy transmittance is not more than 62% at the thickness of 2.1 mm are used. As the respective glass sheets, glass sheets all of which have the same composition and the same thickness may be used, or glass sheets having a different composition and a different thickness from each other within the range of the glass composition of the invention may be used. Further, a glass sheet comprising the glass composition of the invention may be combined with a glass sheet not comprising the glass composition of the invention. The foregoing laminated glass has a visible light transmittance of 69% or more as measured with the CIE Standard illuminant A and a total solar energy transmittance of not more than 45%, and preferably has a total solar energy transmittance of not more than 42%. Further, it may be contemplated to further improve the characteristics by dispersing functional fine particles such as IR-shielding fine particles as described in, e.g., JP-A-2000-72484, in the resin layer. Moreover, the glass composition of the invention may be used as a single plate glass, a toughened glass, or a double glazing. In those cases, an excellent IR rays shield performance is revealed, too.

EXAMPLES

The invention will be hereunder described in detail with reference to the table.

Table 1 shows glass compositions and optical characteristic values of the Examples and Comparative Examples. In the table, all concentrations are expressed in terms of % by weight.

In the manufacture of glasses, silica sand, boric acid, dolomite, limestone, strontium carbonate, barium carbonate, soda ash, salt cake, potassium carbonate, lithium carbonate, carbon, and iron oxide were compounded and mixed so as to have the proportions as shown in the table, and the resulting batch was heated and melted at 1,450° C. in an electric furnace. Thereafter, the molten glass was cast on a stainless steel plate and annealed to the room temperature. The resulting glass was cut into a proper size and polished for measuring various physical properties.

The glass sheet sample having a thickness of 2.1 mm was measured for visible light transmittance (YA) using the CIE Standard illuminant A and total solar energy transmittance (TG), ultraviolet transmittance (Tuv) as defined according to ISO, dominant wavelength (λd), excitation purity (Pe) using the CIE standard illuminant C, and L*, a*, b* values according to the CIE chromaticity diagram. Further, optical characteristic values and haze ratio of a laminated glass comprising two sheets of each sample having a resin layer therebetween and having a thickness of 5 mm are also shown. As the resin layer, a commercially available polyvinylbutyral film was used. Further, the high-temperature viscosity of the glass was measured using a sample pull-down type automatic viscometer. That is, a platinum ball was hung in the sample molten glass, the sample was pull down together with the container, and a viscous resistance applying to the ball was measured as a load. Then, the viscosity of the sample was determined, from which were then calculated a melting point (a temperature at log η=2) and a working point (a temperature at log η=4). Water resistance and acid resistance were measured based on the measurement method of chemical durability of optical glass as defined according to the Japanese Optical Industry Standards (JOGIS). However, the number of measurement was N=1, and 0.01 N nitric acid was used as an eluate of the acid resistance test.

TABLE 1

| | Example | | | | | | | Comparative Example | | | |
|---|---|---|---|---|---|---|---|---|---|---|---|
| | 12 | 2 | 3 | 4 | 5 | 6 | 7 | 1 | 2 | 3 | 4 |
| Glass composition: | | | | | | | | | | | |
| $SiO_2$ | 70.1 | 70.0 | 69.5 | 69.4 | 70.0 | 70.0 | 70.0 | 70.0 | 71.0 | 71.2 | 68.4 |
| $B_2O_3$ | 0.0 | 0.0 | 0.0 | 0.0 | 0.0 | 0.0 | 0.0 | 0.0 | 0.0 | 0.0 | 0.0 |
| $Al_2O_3$ | 1.98 | 1.98 | 2.40 | 2.40 | 1.98 | 1.98 | 1.98 | 1.57 | 1.7 | 0.6 | 1.7 |
| MgO | 2.89 | 2.89 | 1.62 | 1.61 | 1.89 | 1.89 | 2.89 | 3.19 | 3.5 | 0.0 | 2.0 |
| CaO | 8.96 | 8.95 | 9.18 | 9.18 | 8.96 | 8.96 | 8.96 | 8.26 | 8.0 | 7.9 | 10.0 |
| SrO | 0.0 | 0.00 | 0.00 | 0.00 | 1.00 | 0.00 | 0.00 | 0.0 | 0.0 | 0.0 | 0.0 |
| BaO | 0.00 | 0.00 | 0.00 | 0.00 | 0.00 | 1.00 | 0.00 | 0.0 | 0.0 | 0.0 | 0.0 |
| $Li_2O$ | 0.00 | 0.00 | 0.00 | 0.00 | 0.00 | 0.00 | 0.99 | 0.0 | 0.0 | 0.0 | 0.0 |
| $Na_2O$ | 14.3 | 14.3 | 15.2 | 15.2 | 14.3 | 14.3 | 13.3 | 14.5 | 12.0 | 14.2 | 16.0 |
| $K_2O$ | 1.14 | 0.73 | 1.40 | 1.40 | 1.14 | 1.14 | 1.14 | 0.60 | 0.9 | 5.0 | 0.9 |
| $Fe_2O_3$ | 0.68 | 0.73 | 0.68 | 0.73 | 0.68 | 0.68 | 0.68 | 0.88 | 0.62 | 0.56 | 0.11 |
| $TiO_2$ | 0.03 | 0.03 | 0.03 | 0.03 | 0.03 | 0.03 | 0.03 | 0.06 | 0.35 | 0.00 | 0.03 |
| $CeO_2$ | 0.00 | 0.00 | 0.00 | 0.00 | 0.00 | 0.00 | 0.00 | 0.90 | 1.55 | 0.00 | 0.00 |
| $SO_3$ | 0.00 | 0.00 | 0.00 | 0.00 | 0.00 | 0.00 | 0.00 | 0.00 | 0.00 | 0.3 | 0.00 |
| $FeO/t\text{-}Fe_2O_3$ | 0.32 | 0.29 | 0.35 | 0.35 | 0.30 | 0.30 | 0.30 | 0.26 | — | — | — |
| Characteristics: | | | | | | | | | | | |
| Temperature at log η = 2 | 1392 | 1388 | 1370 | 1378 | 1384 | 1383 | 1389 | 1459 | 1485 | 1425 | 1372 |
| Temperature at log η = 4 | 1001 | 997 | 991 | 997 | 997 | 997 | 996 | 1013 | 1182 | 1000 | 996 |
| Water resistance | 0.03 | 0.03 | 0.03 | 0.03 | 0.03 | 0.03 | 0.03 | 0.05 | 0.04 | — | 0.05 |
| Acid resistance | 0.02 | 0.02 | 0.03 | 0.02 | 0.02 | 0.02 | 0.02 | 0.03 | 0.01 | — | 0.05 |
| Single plate glass: | | | | | | | | | | | |
| Thickness (mm) | 2.1 | 2.1 | 2.1 | 2.1 | 2.1 | 2.1 | 2.1 | 2.1 | 2.1 | 2.1 | 2.1 |
| YA (%) | 81.6 | 81.7 | 81.6 | 80.9 | 81.7 | 81.7 | 81.7 | 80.1 | — | — | — |
| TG (%) | 60.3 | 60.4 | 59.3 | 57.7 | 60.4 | 60.4 | 60.4 | 58.6 | — | — | — |
| Tuv (%) | 35.3 | 34.3 | 36.1 | 35.4 | 34.3 | 34.3 | 34.3 | 19.5 | — | — | — |
| L* | 92.9 | 92.9 | 92.9 | 92.7 | — | — | — | 92.1 | — | — | — |
| a* | −4.6 | −4.5 | −4.6 | −4.9 | — | — | — | −4.9 | — | — | — |
| b* | −0.6 | −0.3 | −0.8 | −0.9 | — | — | — | 1.9 | — | — | — |
| λd (nm) | 493.8 | 495.0 | 492.9 | 492.8 | — | — | — | 518.5 | — | — | — |
| Pe (%) | 2.6 | 2.4 | 2.8 | 3.0 | — | — | — | 1.3 | — | — | — |
| Laminated glass: | | | | | | | | | | | |
| Thickness (mm) | 5.0 | 5.0 | 5.0 | 5.0 | — | — | — | — | — | — | — |
| YA (%) | 72.8 | 72.2 | 72.3 | 71.1 | — | — | — | — | — | — | — |
| TG (%) | 40.6 | 40.1 | 38.8 | 37.4 | — | — | — | — | — | — | — |
| Tuv (%) | 0.2 | 0.1 | 0.1 | 0.1 | — | — | — | — | — | — | — |
| L* | 89.3 | 89.0 | 89.1 | 88.6 | — | — | — | — | — | — | — |
| a* | −8.9 | −9.1 | −9.3 | −9.7 | — | — | — | — | — | — | — |
| b* | −0.5 | 0.0 | −1.2 | −1.2 | — | — | — | — | — | — | — |
| λd (nm) | 495.1 | 496.5 | 493.8 | 493.9 | — | — | — | — | — | — | — |
| Pe (%) | 4.7 | 4.4 | 5.4 | 5.7 | — | — | — | — | — | — | — |
| Haze ratio (%) | 0.3 | 0.4 | 0.3 | 0.3 | — | — | — | — | — | — | — |

Any of Examples 1 to 7 have a melting point of not higher than 1,400° C., a working point of not higher than 1,010° C., a water resistance of not more than 0.03, an acid resistance of not more than 0.03, a visible light transmittance YA of 80.5% or more, and a total solar energy transmittance TG of not more than 60.5%. Especially, Examples 3 and 4 are large in difference between YA and TG and are a glass with an excellent IR rays shield performance. In the case where Examples 1 to 4 are used as a laminated glass, it is noted that these examples are a glass having a visible light transmittance of 71.1% or more, a total solar energy transmittance of not more than 40.6%, and a haze ratio of from 0.3 to 0.4 and having both high visibility and IR ray shield property.

The glass sheet having the glass composition of Example 1 and having a thickness of 4.6 mm had optical characteristics: YA=70.7%, TG=41.6%, Tuv=19.1%, L*=88.4, A*=−9.6, b*=−1.1, λd=494.0 nm, Pe=5.6%. Also, the glass sheet having the glass composition of Example 3 and having a thickness of 4.3 mm had optical characteristics: YA=71.1%, TG=41.5%, Tuv=21.0%, L*=88.6, A*=−9.4, b*=−1.9, λd=492.6 nm, Pe=6.1%. Thus, it is noted that even when the glasses of Examples 1 and 3 are used as a single plate glass, these glasses are a glass having a visible light transmittance of 69% or more and a total solar energy transmittance of not more than 45% and having both high visibility and IR ray shield property.

Comparative Example 1 is a generally used float glass composition and is colored green. Since this glass composition has a high content of total irons and contains cerium oxide, it is excellent in UV ray shield property and IR ray shield property. However, since this glass composition falls outside the scope of the invention with respect to the base composition, it is impossible to make it consistent with a high visible light transmittance, and the resulting laminated glass has a YA of not more than 70%. Therefore, the glass composition of Comparative Example 1 is not preferable. In addition, the melting point is higher by 60° C. or more, and the solubility is inferior. In Comparative Example 2, since the glass has the content of $Al_2O_3$ lower than the range of the invention and the content of MgO higher than the range of the invention, the melting point and working point are higher than those in the Examples by 80° C. or more and about 170° C. or more, respectively, and hence, it is noted that the glass of Comparative Example 2 is inferior in the melting property and workability. In Comparative Example 3, since the glass is lower than the range of the invention with respect to both the contents of $Al_2O_3$ and MgO, the melting point is higher than that of the Examples by 20° C. or higher, and therefore, it is noted that the glass of Comparative Example 3 is inferior in the melting property. In Comparative Example 4, since the glass has the content of $Al_2O_3$ lower than the range of the invention, it is noted that the glass of Comparative Example 4 is inferior in the water resistance and acid resistance.

As described above in detail, according to the invention, there are obtained a glass composition having an excellent IR rays shield performance, which is easy in melting and forming works, and a laminated glass having a low haze ratio and an excellent IR ray shield performance using a glass sheet having such a glass composition. Further, there are obtained a laminated glass that does not use a specific interlayer or heat reflecting film but exhibits an IR rays shield performance substantially equal to those having an interlayer or heat reflecting film and a glass composition that is suitable for use in laminated glasses.

This application is based on Japanese patent application JP 2002-278505, filed on Sep. 25, 2002, the entire content of which is hereby incorporated by reference, the same as if set forth at length.

What is claimed is:

1. A laminated glass comprising at least two glass sheets and at least one resin layer therebetween, wherein the at least two glass sheets includes at least one glass sheet comprising a glass composition comprising, in % by weight,
    65 to 74% of $SiO_2$;
    0 to 5% of $B_2O_3$;
    1.9 to 2.5% of $Al_2O_3$;
    1.0 to 3.0% of MgO;
    5 to 10% of CaO;
    0 to 10% of SrO;
    0 to 10% of BaO;
    0 to 5% of $Li_2O$;
    13 to 17% of $Na_2O$;
    0.5 to 5% of $K_2O$;
    0 to 0.40% of $TiO_2$; and
    0.3 to 2.0% of total iron oxide in terms of $Fe_2O_3$ (T-$Fe_2O_3$),
    in which the sum of MgO, CaO, SrO and BaO is 10 to 15%, and the sum of $Li_2O$, $Na_2O$ and $K_2O$ is 14 to 20%,
    wherein, at a thickness of 2.1 mm, the glass composition has a visible light transmittance of 80% or more as measured with the CIE Standard illuminant A and a total solar energy transmittance of not more than 62%,
    and the laminated glass has a visible light transmittance of 69% or more as measured with the CIE Standard illuminant A and a total solar energy transmittance of not more than 45%.

2. The laminated glass according to claim 1, wherein the total solar energy transmittance is not more than 42%.

3. The laminated glass according to claim 1, wherein the resin layer contains functional fine particles dispersed therein.

* * * * *